(12) United States Patent
He et al.

(10) Patent No.: US 12,342,358 B2
(45) Date of Patent: Jun. 24, 2025

(54) RESOURCE SELECTION METHOD AND APPARATUS, RESOURCE INDICATION METHOD AND APPARATUS, AND TERMINAL AND STORAGE MEDIUM

(71) Applicant: ZTE CORPORATION, Shenzhen (CN)

(72) Inventors: Haigang He, Shenzhen (CN); Youxiong Lu, Shenzhen (CN); Jie Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 237 days.

(21) Appl. No.: 18/040,517

(22) PCT Filed: Aug. 6, 2021

(86) PCT No.: PCT/CN2021/111254
§ 371 (c)(1),
(2) Date: Feb. 3, 2023

(87) PCT Pub. No.: WO2022/028591
PCT Pub. Date: Feb. 10, 2022

(65) Prior Publication Data
US 2023/0284241 A1 Sep. 7, 2023

(30) Foreign Application Priority Data
Aug. 6, 2020 (CN) .......................... 202010785584.3

(51) Int. Cl.
*H04W 72/25* (2023.01)
*H04W 72/02* (2009.01)

(52) U.S. Cl.
CPC ........... *H04W 72/25* (2023.01); *H04W 72/02* (2013.01)

(58) Field of Classification Search
CPC .............................. H04W 72/25; H04W 72/02
See application file for complete search history.

(56) References Cited

U.S. PATENT DOCUMENTS

| | | | |
|---|---|---|---|
| 11,082,954 B2 * | 8/2021 | Huang | ................. H04L 1/1819 |
| 2016/0057604 A1 | 2/2016 | Luo et al. | |
| 2018/0103490 A1 | 4/2018 | Li et al. | |
| 2020/0037343 A1 | 1/2020 | He et al. | |
| 2020/0205165 A1 | 6/2020 | Huang et al. | |

FOREIGN PATENT DOCUMENTS

| | | |
|---|---|---|
| CN | 107659965 A | 2/2018 |
| CN | 108702758 A | 10/2018 |

(Continued)

OTHER PUBLICATIONS

International Search Report for Application No. PCT/2021/111254 dated Nov. 5, 2021, 4 pages including translation.

(Continued)

*Primary Examiner* — Rhonda L Murphy
(74) *Attorney, Agent, or Firm* — Morgan, Lewis & Bockius LLP

(57) ABSTRACT

Provided are a resource selection method and apparatus, a resource indication method and apparatus, and terminals and a storage medium. The method includes: indicating position information of multiple resources, and performing resource reselection based on resource availability information, where the resource availability information is from the second terminal.

19 Claims, 8 Drawing Sheets

```
┌─────────────────────────────────────────────────┐  S110
│  Indicate position information of multiple resource │
└─────────────────────────────────────────────────┘
                       │
                       ▼
┌─────────────────────────────────────────────────────────┐  S120
│ Perform a resource reselection based on resource availability information, │
│   where the resource availability information is from a second terminal   │
└─────────────────────────────────────────────────────────┘
```

(56) References Cited

FOREIGN PATENT DOCUMENTS

| CN | 108810906 | A | | 11/2018 | |
|---|---|---|---|---|---|
| CN | 109691146 | A | | 4/2019 | |
| CN | 110536430 | A | | 12/2019 | |
| CN | 110677883 | A | | 1/2020 | |
| CN | 110958096 | A | | 4/2020 | |
| CN | 111096015 | A | | 5/2020 | |
| CN | 111130733 | A | | 5/2020 | |
| CN | 107113914 | B | | 7/2020 | |
| CN | 111464953 | A | | 7/2020 | |
| CN | 111934835 | A | | 11/2020 | |
| CN | 111194057 | A | | 5/2022 | |
| EP | 4246862 | A2 | * | 9/2023 | ........... H04L 1/0007 |
| WO | WO 2017/176097 | A1 | | 10/2017 | |
| WO | WO 2020/028662 | A1 | | 2/2020 | |
| WO | WO2020/102177 | A1 | | 5/2020 | |

OTHER PUBLICATIONS

Chinese Office Action of Application No. 202010785584.3, dated Mar. 18, 2024, 18 pages including translation.

Japanese Office Action of Application No. 2023-506557, dated Dec. 27, 2023, 8 pages including translation.

LG Electronics, "Discussion on resource allocation for Mode 2", 3GPP TSG RAN WG1 Meeting #100, R1-2000783, e-Meeting, Feb. 24-Mar. 6, 2020, 17 pages.

Samsung, "On Resource Allocation for NR V2X Mode 2", 3GPP TSG RAN WG1 #99, R1-1912460, Reno, USA, Nov. 18-22, 2019, 8 pages.

Extended European Search Report in Application No. 21853278.6, dated Jul. 18, 2024, 10 pages, including translation.

CMCC: "Discussion on resource allocation mechanism for NR V2X", 3GPP TSG RAN WG1 Meeting #95, ; R1-1812880, Spokane, USA; Nov. 12-16, 2018 Retrieved from the Internet: URL:http://www.3gpp.org/ftp/Meetings%5F3GPP%5FSYNC/RAN1/Docs/R1%2D1812880%2Ezip [retrieved on Nov. 11, 2018].

LG Electronics: "Discussion on resource allocation for Mode 2", 3GPP TSG RAN WG1 #98; R1-1910779, Chongqing, China; Oct. 14- 20, 2019 Retrieved from the Internet: URL:http://www.3gpp.org/ftp/tsg_ran/WG1_RL 1/TSGR1_98b/Docs/R1-1910779.zip [retrieved on Oct. 8, 2019].

* cited by examiner

Indicate resource availability information to the first terminal, where the resource availability information is used for indicating availability of a resource set, and the resource set is a subset of multiple resources indicated by the first terminal — S210

RESOURCE SELECTION METHOD AND APPARATUS, RESOURCE INDICATION METHOD AND APPARATUS, AND TERMINAL AND STORAGE MEDIUM

CROSS REFERENCE TO RELATED APPLICATIONS

This is a National Stage Application filed under 35 U.S.C. 371, based on International Patent Application No. PCT/CN2021/111254, filed on Aug. 6, 2021, which claims priority to Chinese Patent Application No. 202010785584.3 filed with the China National Intellectual Property Administration (CNIPA) on Aug. 6, 2020, the disclosures of which are incorporated herein by reference in their entireties.

TECHNICAL FIELD

The present application relates to the field of communication technology, for example, a resource selection method and apparatus, a resource indication method and apparatus, and a terminal and a storage medium.

BACKGROUND

In sidelink communication, the terminal device selects the resources that are not occupied by other terminal devices and the resources that are occupied but the interference signal strength is less than the threshold as a candidate resource set by monitoring the resource usage of other user devices. Therefore, when the terminal device selects the resources in the candidate resource set, a strong interference signal does not exist in the selected resources, so that normal communication of sidelink can be performed. However, in practical applications, resources are occupied by other terminal devices, but cannot be monitored by terminal device. In one case, in the process of sending information, due to the restrictions of half-duplex, the terminal device cannot receive information sent from other terminal devices at the same moment, so that the resources to be occupied indicated by other terminal devices at this moment cannot be monitored. As a result, resources occupied by other terminal devices and of which the interference signal strength is greater than the threshold will exist in the candidate resource set. When the terminal devices select resources in the candidate resource set, the resources occupied and of which the interference signal strength is large will appear, thereby reducing the reliability of sidelink communication.

SUMMARY

Embodiments of the present application provide a resource selection method and apparatus, a resource indication method and apparatus, a terminal device and a storage medium, so as to improve reliability of communication of a first terminal.

An embodiment of the present application provides a resource selection method, which is applied to a first terminal and includes: indicating position information of multiple resources, and performing resource reselection based on resource availability information, where the resource availability information is from a second terminal.

An embodiment of the present application provides a resource indication method, which is applied to a second terminal and includes: indicating resource availability information to a first terminal, where the resource availability information is used for indicating availability of a resource set, and the resource set is a subset of multiple resources indicated by the first terminal.

An embodiment of the present application provides a resource selection apparatus, including a resource position information indication module and a resource reselection module. The resource position information indication module is configured to indicate position information of multiple resources, and the resource reselection module is configured to perform resource reselection based on resource availability information, where the resource availability information is from a second terminal.

An embodiment of the present application provides a resource indication apparatus, including a resource availability information indication module. The resource availability information indication module is configured to indicate resource availability information to a first terminal, where the resource availability information is used for indicating availability of a resource set, and the resource set is a subset of multiple resources indicated by the first terminal.

An embodiment of the present application further provides a first terminal, and the first terminal includes a memory, a processor, a program stored on the memory and executable on the processor and a data bus for enabling connection communication between the processor and the memory, where the program, when executed by the processor, implements the resource selection method described above.

An embodiment of the present application further provides a second terminal, and the second terminal includes a memory, a processor, a program stored on the memory and executable on the processor and a data bus for enabling connection communication between the processor and the memory, where the program, when executed by the processor, implements the resource indication method described above.

An embodiment of the present invention further provides a storage medium configured as computer readable storage, storing one or more programs executable by one or more processors to implement the preceding resource selection method.

An embodiment of the present invention further provides a storage medium configured as computer readable storage, storing one or more programs executable by one or more processors to implement the preceding resource indication method.

According to the resource selection method and apparatus, the resource indication method and apparatus, the terminal and the storage medium, by adopting the coordination mechanism between the terminal devices, the first terminal indicates the position information of multiple resources to the second terminal and performs resource reselection based on the resource availability information from the second terminal, thereby reducing or avoiding the resource conflict between the first terminal and different user devices and improving the reliability of communication.

DETAILED DESCRIPTION

It is to be understood that the specific embodiments described herein are intended to explain the present application and not to limit the present application.

Suffixes such as "module", "component" or "unit" used for indicating elements in the subsequent description are used merely for facilitating the description of the present application, and have no particular meaning in themselves. Therefore, "module", "component" or "unit" may be used in a mixed manner.

Embodiment One

Figure 1:
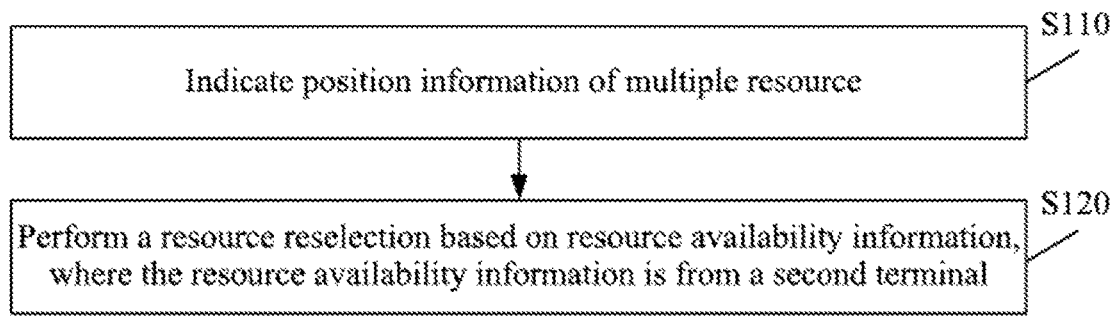
FIG. 1 is a flowchart of a resource selection method according to an embodiment 1 of the present application.

As shown in FIG. 1, this embodiment provides a resource selection method, and the method includes the following.

In S110, position information of multiple resources is indicated.

Figure 2:
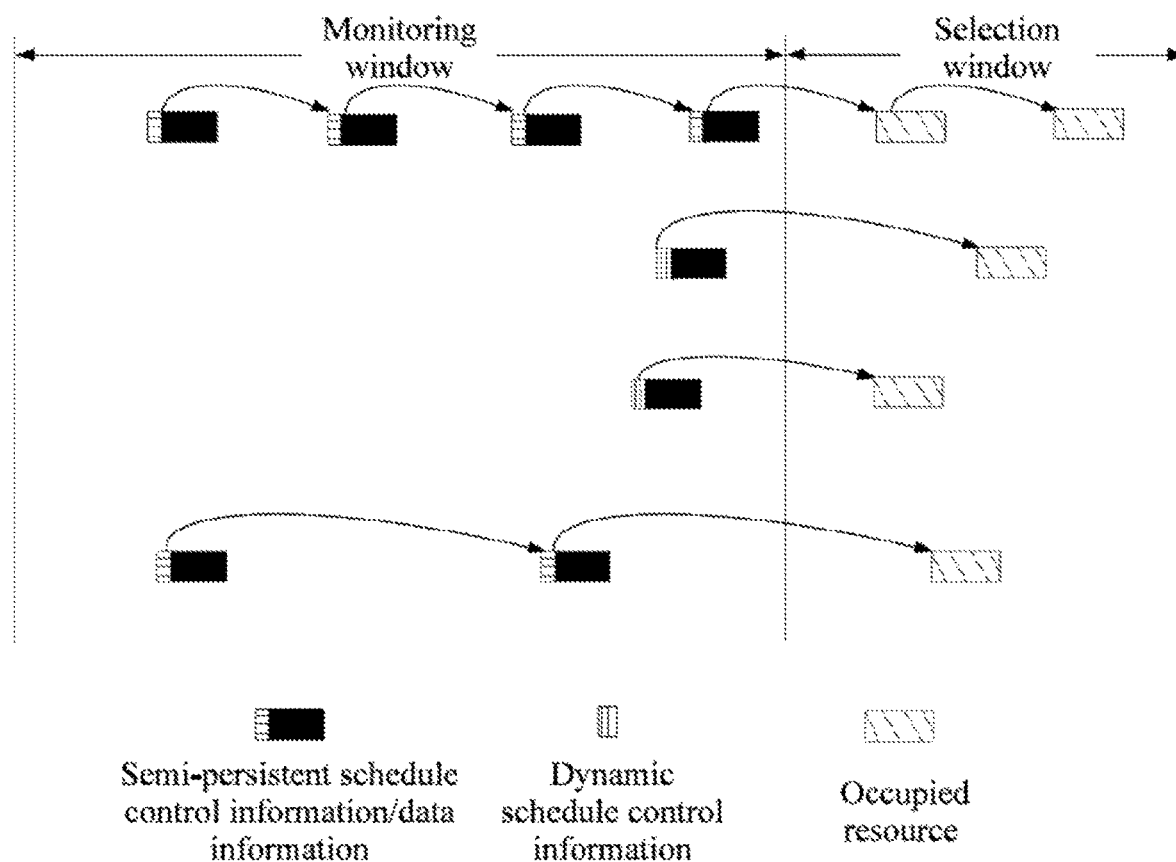
FIG. 2 is a diagram illustrating a first terminal selecting resources through a monitoring window and a selection window according to a first embodiment of the present application.

A first terminal in this embodiment acquires resource occupancy information in a selection window by monitoring in a monitoring window before indicating the position information of multiple resources, and selects a resource in the selection window according to the resource occupancy information. For example, FIG. 2 shows a diagram illustrating the first terminal selecting a resource through the monitoring window and the selection window in this embodiment. Before the first terminal sends information to the second terminal and/or other terminals, the first terminal acquires the resources being used and to be used by the other user devices by receiving the control information of the other user devices, and in particular acquires the positions of the resources occupied by the other user devices in the resource selection window by receiving the control information sent by the other user devices in the monitoring window. The first terminal further measures the signal strength of the resources occupied by the other user devices in the selection window, eliminates resources occupied by the other user devices of which the signal strength is greater than a threshold value in the selection window, configures the remaining resources as a candidate resource set, and selects the resource from the candidate resource set.

In an example, the control information is sent based on a physical sidelink control channel (PSCCH), where the control information includes the position information of the resources, and the position information of the resources includes the time-frequency positions of the occupied resources.

Figure 3:
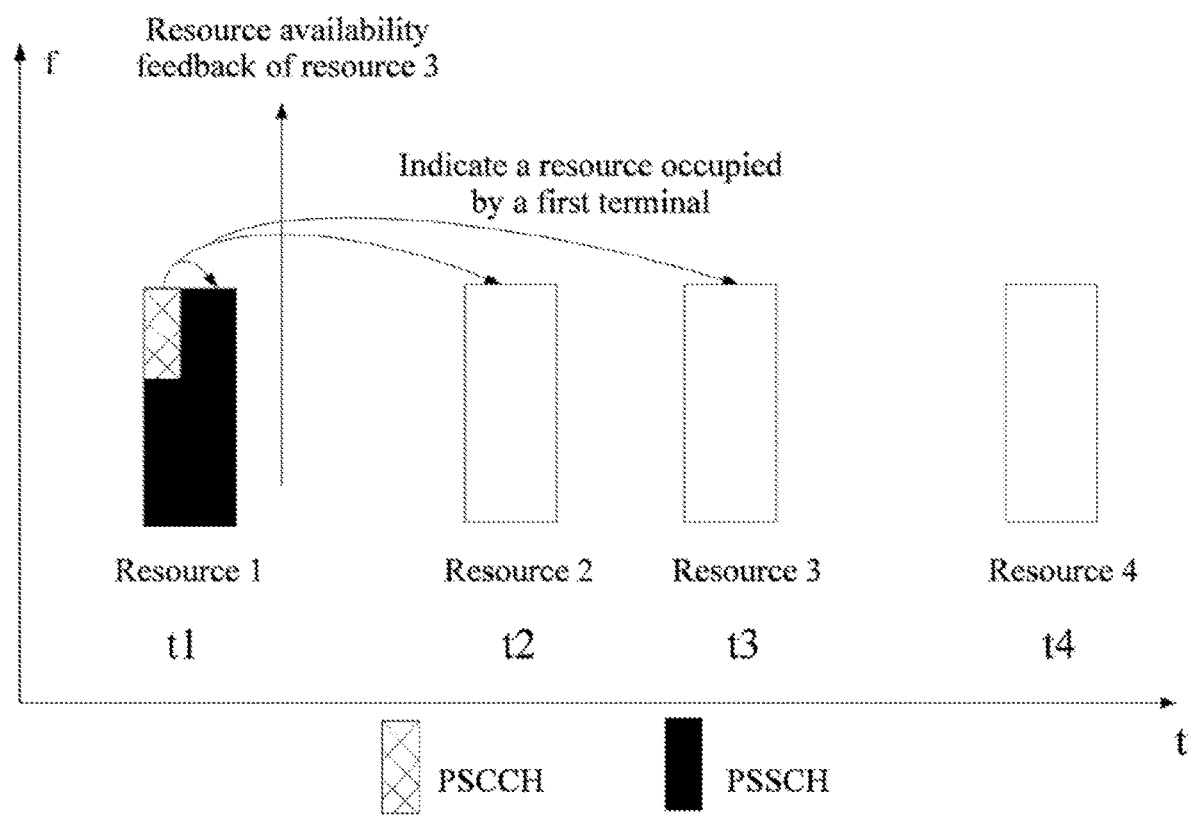
FIG. 3 is a diagram illustrating a first terminal performing resource indication through a physical sidelink control channel (PSCCH) according to embodiment one of the present application.

FIG. 3 is a diagram illustrating a first terminal performing resource indication through a PSCCH in this embodiment. Based on the monitoring process, the resources selected by the first terminal are respectively: resource 1, resource 2, resource 3 and resource 4. After the resource selection is performed, the first terminal sends the control information to the second terminal, or the second terminal and other terminals by the PSCCH transmission on the resources, and indicates the time-frequency positions of the occupied resources through the control information. For example, the first terminal indicates the time-frequency positions of the occupied resource 1, resource 2 and resource 3 by the PSCCH on the resource 1 at moment t1. Although the resources finally selected by the first terminal from the candidate resource set include: resource 1, resource 2, resource 3, and resource 4, since the number of resources indicated by the first terminal at the current moment t1 is set in advance and is set to 3 in this embodiment, the control information sent by the first terminal to the second terminal at the current moment t1 only includes the time-frequency positions of the occupied resource 1, resource 2, and resource 3.

In S120, a resource reselection is performed based on resource availability information, where the resource availability information is from the second terminal.

In an example, the resource availability information is used for indicating whether resources are in a resource set.

In an example, the resource reselection is performed on a target resource based on the resource availability information, and releasing the target resource is indicated.

In an example, performing the resource reselection based on the resource availability information includes: in a case where the resource availability information from the second terminal indicates that a designated resource is an unavailable resource, reselecting, by the first terminal, a designated resource, where the reselected resource is different from the designated resource.

In an example, the first terminal indicates the position information of multiple resources, the first terminal receives the resource availability information from the second terminal, the first terminal expects that the resource availability information indicates availability of the last one or more resources of the multiple resources.

After the time-frequency positions of multiple occupied resources are indicated to the second terminal, the first terminal receives the resource availability information from the second terminal, where the resource availability information is used for indicating the availability of a resource set, and the resource set is a subset of multiple resources indicated by the first terminal.

Figure 4:
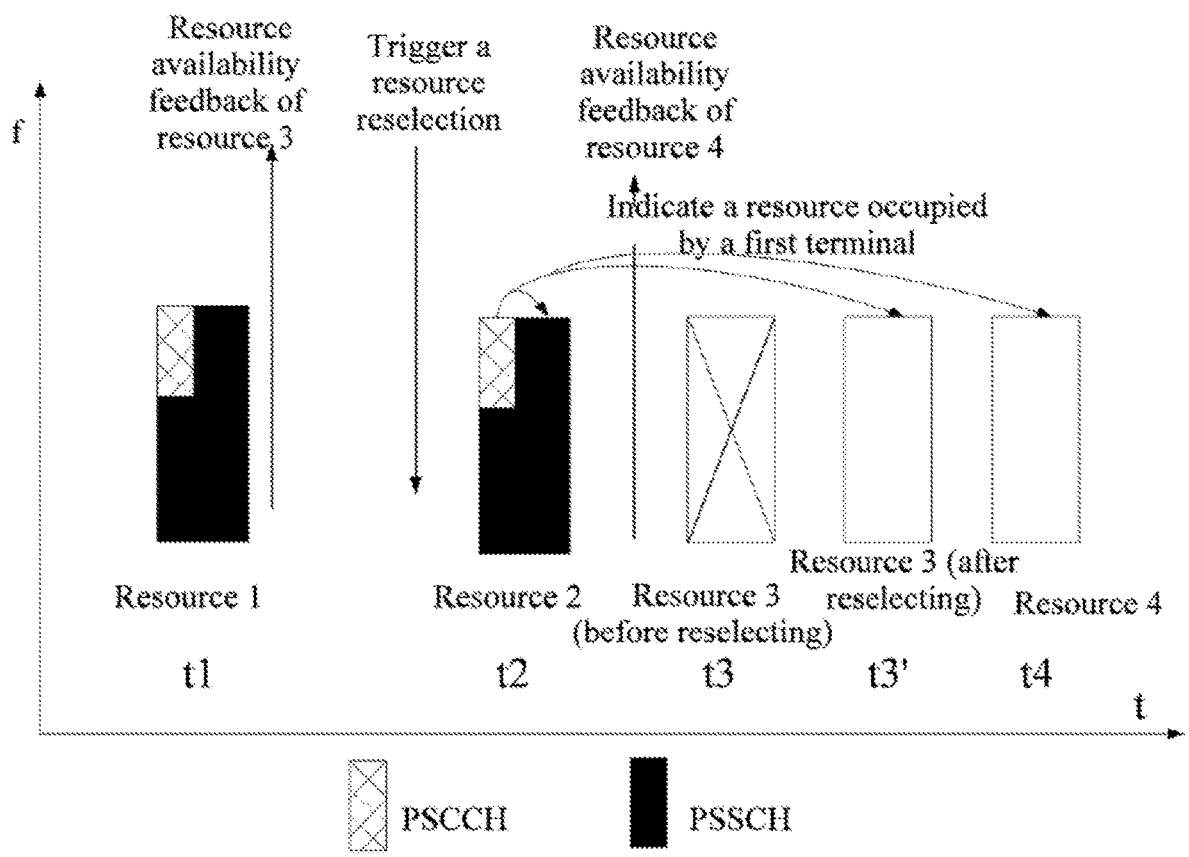
FIG. 4 is a diagram illustrating a first terminal performing a resource reselection according to embodiment one of the present application.

For example, the occupied resources indicated by the first terminal are: time-frequency positions of resource 1, resource 2 and resource 3, the resource availability information from the second terminal may include the availability of the resource set {resource 2, resource 3}, or the availability of the resource set {resource 3}. The specific content of the resource set is not limited in this embodiment, and the resource set {resource 3} is described as an example in this embodiment. FIG. 4 is a diagram illustrating a first terminal performing resource reselection according to this embodiment. When the first terminal receives the resource availability information from the second terminal and the resource availability information indicates that the resource 3 is unavailable, the first terminal triggers the resource reselection, and the resource 3 needs to be reselected, and the re-selected resource 3 is different from the resource 3 occupied before reselection is performed. After the resource reselection is performed, the first terminal indicates the time-frequency positions of the resource 2, the reselected resource 3 and the reselected resource 4 through the PSCCH transmitted on the resource 2 at a later transmission moment, i.e., moment t2. At moment t2, the first terminal also indicates that the resource 3 before performing the reselection is released through the PSCCH, that is, the resource 3 before the reselection no longer belongs to the occupied resources of the first terminal. Since the manner in which the first terminal indicates a resource to the second terminal through the control information at moment t2 is substantially the same as the manner in which the resource is indicated at the current moment t1, this embodiment will not be described in detail.

According to the resource selection method, by adopting the coordination mechanism between the terminal devices, the first terminal indicates the position information of multiple resources to the second terminal and performs resource reselection based on the resource availability information from the second terminal, thereby reducing or avoiding the resource conflict between the first terminal and different user devices and improving the reliability of communication.

Embodiment Two

This embodiment is based on the above-mentioned embodiment. In this embodiment, at least one resource for indicating resource availability information is included between two resources selected by the first terminal.

In an example, the resource availability information is from the second terminal, and the first terminal indicates a position of a resource for indicating the resource availability information to the second terminal.

In an example, the first terminal selects multiple resources and indicates position information of multiple resources, and existence of a resource for indicating the resource availability information between two adjacent resources of the multiple resources selected by the first terminal is restricted.

In an example, the first terminal indicates a position of the resource for indicating the resource availability information.

In this embodiment, when the first terminal selects multiple resources, and existence of the resource used for indicating the resource availability information and located between two adjacent resources of the multiple resources selected by the first terminal is restricted. The first terminal indicates the position of the resource for indicating the resource availability information to the second terminal, and the first terminal specifically receives the resource availability information from the second terminal through the resource for indicating the resource availability information.

Figure 5:
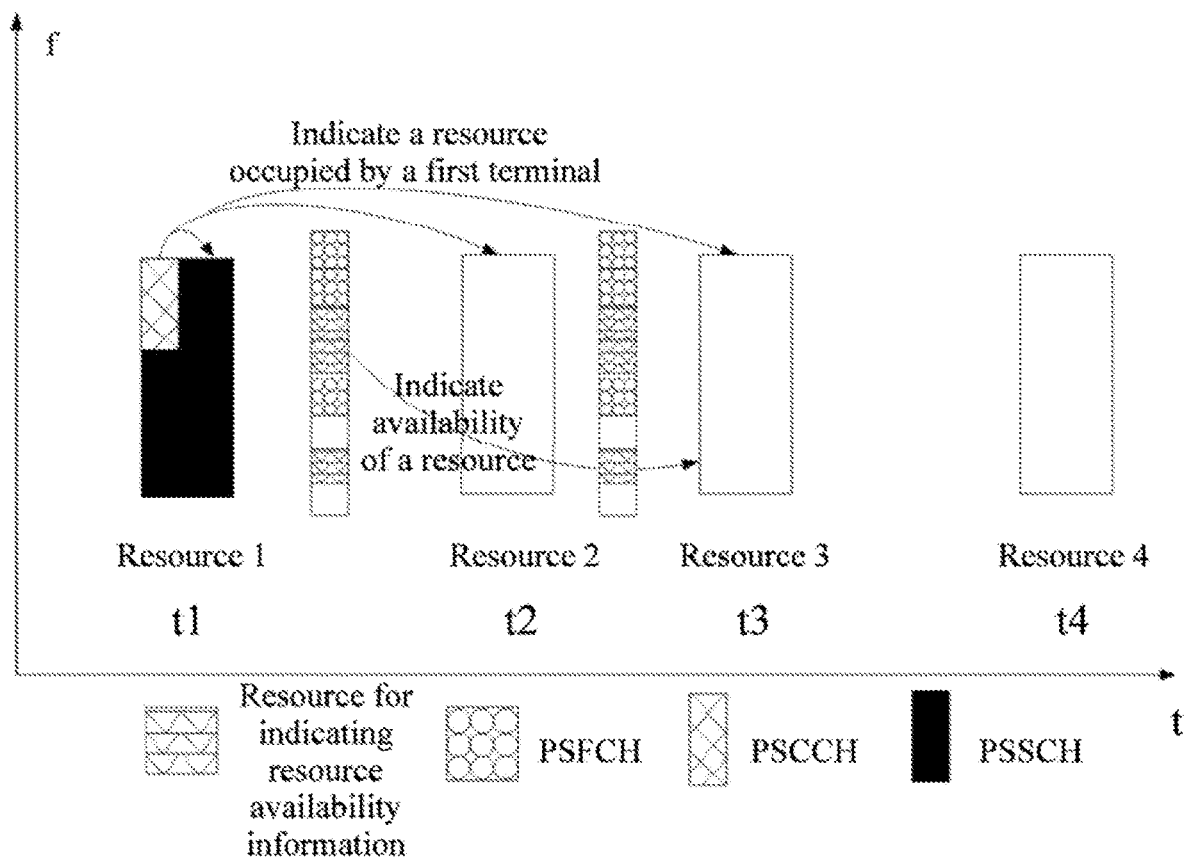
FIG. 5 is a diagram illustrating determining a position of a resource for indicating resource availability information according to embodiment two of the present application.

FIG. 5 is a diagram illustrating determining a position of a resource for indicating resource availability information in this embodiment. Resource 1 and resource 2 belong to adjacent resources, resource 2 and resource 3 belong to adjacent resources, and resource 3 and resource 4 belong to adjacent resources. When the first terminal performs the resource selection, it is ensured that at least one resource for indicating the resource availability information is included between the selected two adjacent resources. That is, at least one resource for indicating the resource availability information is included between adjacent resource 1 and resource 2, and at least one resource for indicating the resource availability information is included between adjacent resource 2 and resource 3. However, for the last two adjacent resources, for example, a resource for indicating the resource availability information included between resource 3 and resource 4 is not limited.

Embodiment Three

This embodiment is based on the above-mentioned embodiment. In this embodiment, a time interval between the resource for indicating the resource availability information and the first resource in adjacent resources is greater than or equal to a first threshold value, and a time interval between the resource for indicating the resource availability information and the second resource in adjacent resources is greater than or equal to a second threshold value.

In an example, the first terminal selects multiple resources and indicates position information of multiple resources, and the resource for indicating the resource availability information between the first resource and the second resource. The time interval between the resource for indicating the resource availability information and the first resource is greater than or equal to the first threshold value, and the time interval between the resource for indicating the resource availability information and the second resource is greater than or equal to the second threshold value.

Figures 6, 7:
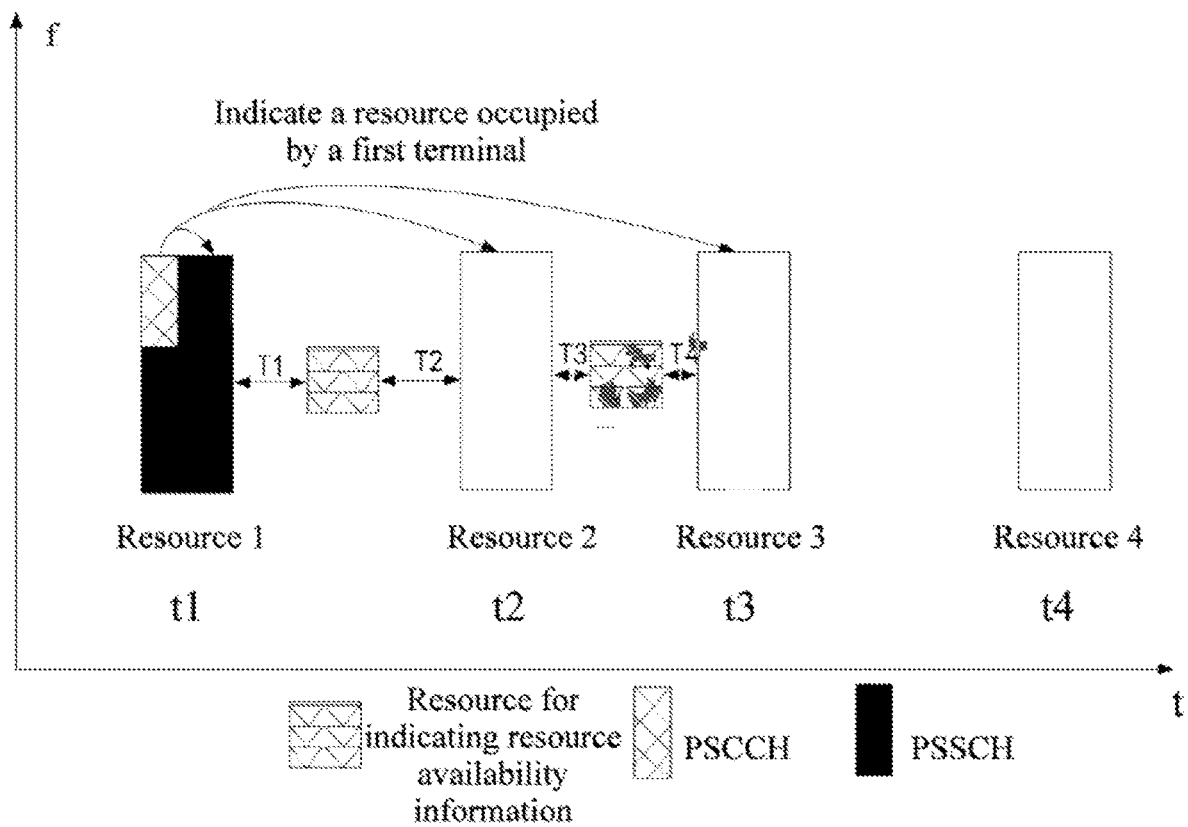
FIG. 6 is a diagram illustrating determining a position of a resource for indicating resource availability information according to embodiment three of the present application.
FIG. 7 is a flowchart of a resource indication method according to embodiment five of the present application.

FIG. 6 is a diagram illustrating determining a position of a resource for indicating resource availability information in this embodiment. The first terminal selects four resources, i.e., resource 1, resource 2, resource 3, and resource 4, in the process of selecting resources. The resource for indicating resource availability information exists between the selected two adjacent resources. For example, for a group of adjacent resource 1 and resource 2, in the process of selecting resources, the first terminal ensures that at least one resource for indicating the resource availability information is included between two resources, the time interval T1 between the at least one resource for indicating the resource availability information and resource 1 is greater than or equal to the first threshold value, and the time interval between the at least one resource for indicating the resource availability information and resource 2 is greater than or equal to the second threshold value. For a second group of adjacent resource 2 and resource 3, in the process of selecting resources, the first terminal ensures that at least one resource for indicating the resource availability information is included between two resources, the time interval T3 between the at least one resource for indicating the resource availability information and resource 2 is greater than or equal to the first threshold value, and the time interval T4 between the at least one resource for indicating the resource availability information and resource 3 is greater than or equal to the second threshold value. However, for the last two adjacent resources, i.e. resource 3 and resource 4, a resource for indicating the resource availability information included between resource 3 and resource 4 is not limited. Therefore, at least one resource for indicating resource availability is included between two adjacent occupied resources indicated by the first terminal based on the PSCCH and through the control information, where the time interval between the at least one resource for indicating resource availability and the first resource of the two adjacent resources is greater than or equal to the first threshold value, and the time interval between the at least one resource for indicating resource availability and the second resource of the two adjacent resources is greater than or equal to the second threshold value.

It is to be noted that if multiple qualified resources for indicating the resource availability information exist between two adjacent occupied resources indicated by the first terminal based on the PSCCH and through the control information, a resource with the latest time is selected from the multiple qualified resources for indicating the resource availability information.

Embodiment Four

This embodiment is based on the above-mentioned embodiment. In this embodiment, a position of a resource for indicating the resource availability information overlaps a position of a time-domain symbol corresponding to a physical sidelink feedback channel (PSFCH).

In an example, the first terminal expects that the position of the resource for indicating the resource availability information overlaps the position of the time-domain symbol corresponding to the PSFCH.

As shown in FIG. 5, the resource for indicating the resource availability information has the same position as the PSFCH symbol in the time domain, and each PSFCH occupies two time domain symbols, a corresponding resource for indicating the resource availability information also occupies two time domain symbols, and the positions of the two time domain symbols overlap the positions of the two time domain symbols occupied by the PSFCH.

It is to be noted that the first terminal or the base station also configures one or more frequency domain positions of resources for indicating the resource availability information by high-level signaling, for example, the configured one or more frequency domain positions of the resources for indicating the resource availability information are orthogonal to, i.e. do not overlap, the frequency domain position of PSFCH.

Embodiment Five

As shown in FIG. 7, this embodiment provides a resource indication method. The method includes the following.

In S210, resource availability information is indicated to a first terminal, where the resource availability information is used for indicating availability of a resource set, and the resource set is a subset of multiple resources indicated by the first terminal.

In an example, the resource availability information is used for indicating whether resources are in a resource set.

In an example, the control information from the first terminal is received based on the PSCCH, where the control information from the first terminal includes the position information of multiple resources, and the position information of the multiple resources is the time-frequency positions of the resources occupied by the first terminal.

In an example, the resource set includes that a resource set is a subset of multiple resources indicated by the first terminal, and a resource set is the last one or more resources of the multiple resources indicated by the first terminal.

Figure 8:
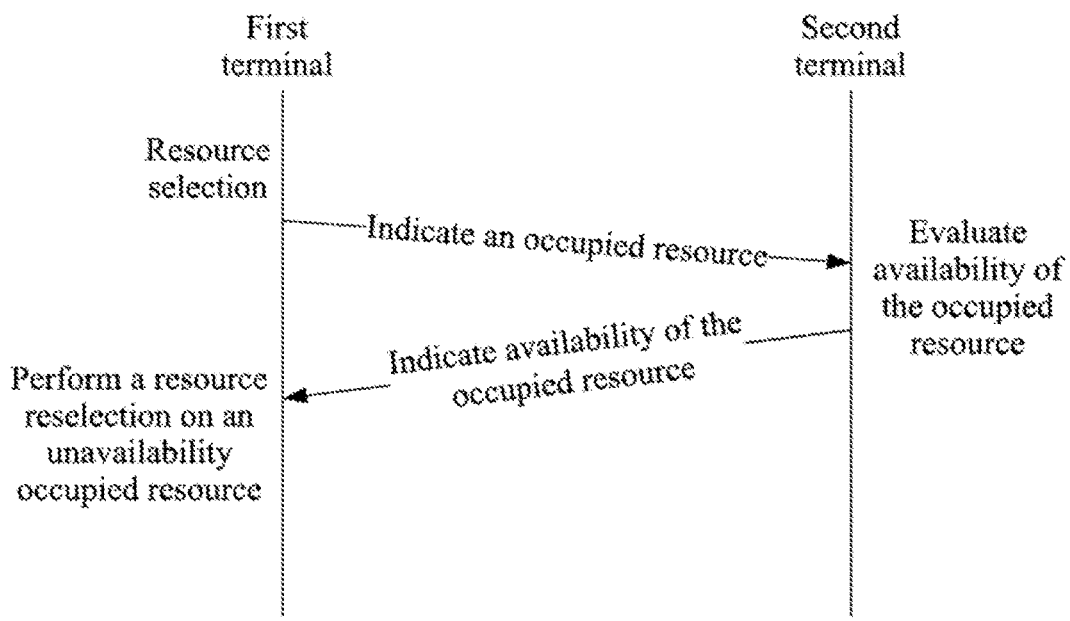
FIG. 8 is a diagram illustrating information interaction between a first terminal and a second terminal according to embodiment five of the present application.

FIG. 8 is a diagram illustrating information interaction between a first terminal and a second terminal in this embodiment. In this embodiment, the second terminal receives the control information from the first terminal based on the PSCCH to acquire the time-frequency positions of the occupied resources indicated by the first terminal through the control information. For example, as shown in FIG. 3, at the current moment t1, the control information received by the second terminal from the first terminal includes the time-frequency positions of the occupied resource 1, resource 2 and resource 3. The second terminal evaluates the availability of the subset of multiple resources indicated by the first terminal according to the control information from the first terminal. The specific evaluation manner may include judging whether the resources in the subset are used by the user devices other than the first terminal, and the interference signal strength of the resources is greater than the preset threshold. If the resources in the subset are used by the user devices other than the first terminal and the interference signal strength of the resources is greater than the preset threshold, the resources in the subset are determined to be unavailable. If the resources in the subset are not used by the user devices other than the first terminal, or the resources in the subset are used by the user devices other than the first terminal, and the interference signal strength of the resources is not greater than the preset threshold, the resources in the subset are determined to be available. After the evaluation is finished, the resource availability information is indicated to the first terminal. Therefore, when the occupied resources indicated by the first terminal are the time-frequency positions of resource 1, resource 2 and resource 3, the resource availability information fed back by the second terminal to the first terminal can include the availability of the resource set {resource 2 resource 3}, or the availability of the resource set {resource 3}. The specific content of the resource set is not limited in this embodiment, and the resource set {resource 3} is described as an example in this embodiment.

In an example, indicating the resource availability information to the first terminal includes a resource for indicating the resource availability information is located between two resources, where the two resources are two adjacent resources among multiple resources indicated by the first terminal.

In an example, indicating the resource availability information to the first terminal includes a resource for indicating the resource availability information is located between two resources, where the two resources are a first resource and a second resource among multiple resources indicated by the first terminal.

In an example, indicating the resource availability information to the first terminal includes that the resource for indicating the resource availability information is located between the two resources, where the time interval between the resource for indicating the resource availability information and the first resource of two resources is greater than or equal to the first threshold value, and the time interval between the resource for indicating the resource availability information and the second resource of two resources is greater than or equal to the second threshold value.

In an example, indicating the resource availability information to the first user device includes the position of the resource for indicating the resource availability information overlaps the position of the time-domain symbol corresponding to the PSFCH.

In this embodiment, the resource for indicating resource availability is included between two adjacent resources indicated by the first terminal, where the time interval between the resource for indicating the resource availability information and the first resource of the two adjacent resources is greater than or equal to the first threshold value, the time interval between the resource for indicating the resource availability information and the second resource of the two adjacent resources is greater than or equal to the second threshold value, and the position of the resource for indicating the resource availability information overlaps the position of the time domain symbol corresponding to the PSFCH. For example, when it is determined that the resource set is {resource 3}, resource 3 of the second terminal is used by the user device other than the first terminal, and the interference signal strength is greater than the preset threshold value, the indication information in which the resource 3 is unavailable is specifically sent to the first terminal through the resource for indicating the resource availability information and located between the resource 1 and the resource 2, and according to the indication information, the first terminal will perform reselection in a case of determining that the resource 3 is unavailable. Reference can be made to Embodiments 1 to 4 for the position of the resource for indicating the resource availability information and the specific interaction process between the first terminal and the second terminal, and no tracing is performed in this embodiment.

According to the resource indication method, by adopting the coordination mechanism between the terminal devices, the first terminal indicates the position information of multiple resources to the second terminal and performs resource reselection based on the resource availability information from the second terminal, thereby reducing or avoiding the resource conflict between the first terminal and different user devices and improving the reliability of communication.

Embodiment Six

This embodiment is based on the above-mentioned embodiment. In this embodiment, the second terminal indicates the control information to the first terminal based on the resource for indicating the resource availability information, where the control information further includes acknowledgement information or negative acknowledgement information.

In an example, indicating the resource availability information to the first terminal includes indicating the control information to the first terminal base on the resource for indicating the resource availability information, where the control information includes resource availability indication information and acknowledgement information or negative acknowledgement information.

In an example, indicating the resource availability information to the first terminal includes indicating the control information to the first terminal base on the resource for indicating the resource availability information, where the control information includes resource availability indication information and acknowledgement information or negative acknowledgement information.

Figure 9:
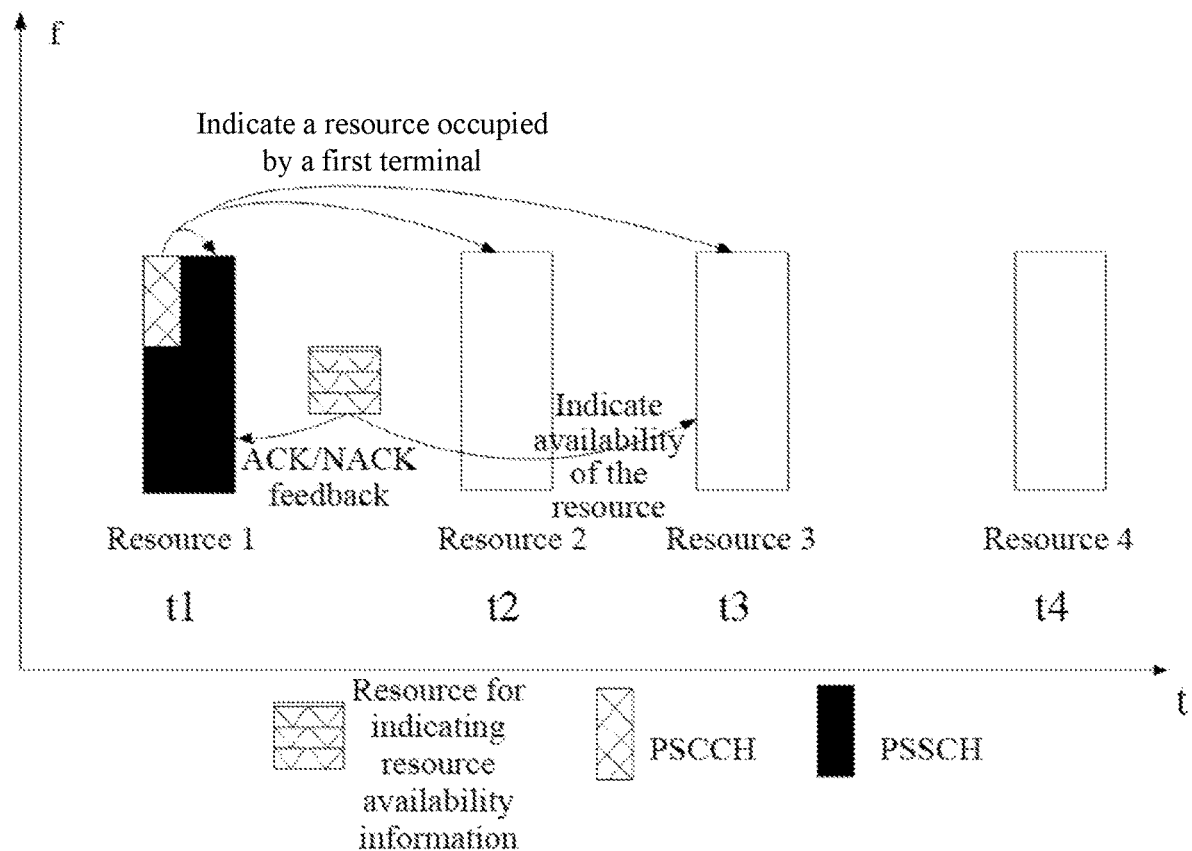
FIG. 9 is a diagram illustrating a resource for indicating resource availability information transmitting control information according to embodiment six of the present application.

FIG. 9 is a diagram illustrating a resource for indicating resource availability information transmitting control information in this embodiment. In this embodiment, the second terminal may not only feed back the resource availability indication information to the first terminal through the resource for indicating the resource availability information, but also feed back the acknowledgement information or the negative acknowledgement information to the first terminal at the same time. The occupied resources indicated by the first terminal to the second terminal include: the time-frequency positions of resource 1, resource 2 and resource 3.

At the moment between t1 and t2, the second terminal indicates the control information to the first terminal through the resource for indicating the resource availability information, and the control information includes indication information in which the resource 3 is unavailable, and ACK/NACK feedback information, where ACK is an acknowledgement representing that the second terminal successfully receives the data sent by the first terminal based on the PSSCH, and NACK is a negative acknowledgement representing that the second terminal does not successfully receive the data sent by the first terminal based on the PSSCH. In the control information carried by the resource for indicating the resource availability information, the last N bits are used for representing the occupied resource availability information, and the bits other than the last N bits are used for representing the ACK/NACK feedback information, where N=1 can be selected. Of course, this embodiment will only be described by way of example, and the specific value of N is not limited. As long as the control information carried by the resource for indicating the resource availability information simultaneously carries the indication resource availability information and the ACK/NACK feedback information, it is within the protection scope of the present application and is not limited in this embodiment of the present application.

Embodiment Seven

Figure 10:
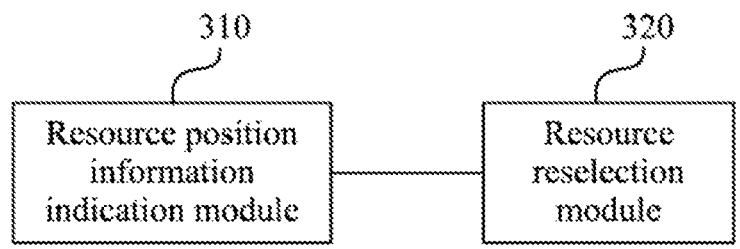
FIG. 10 is a structural diagram of a resource selection apparatus according to embodiment seven of the present application.

As shown in FIG. 10, the resource selection apparatus provided in this embodiment includes a resource position information indication module 310 and a resource reselection module 320.

The resource position information indication module 310 is configured to indicate position information of multiple resources, and the resource reselection module 320 is configured to perform resource reselection based on resource availability information, where the resource availability information is from a second terminal.

In an example, the control information is sent based on a physical sidelink control channel (PSCCH), where the control information includes the position information of the resources, and the position information of the resources includes the time-frequency positions of the occupied resources.

In an example, the resource reselection module 320 is configured to perform the resource reselection on a target resource based on the resource availability information, and indicate that the target resource is released.

In an example, the resource availability information is from the second terminal, and the first terminal indicates a position of a resource for indicating the resource availability information to the second terminal.

In an example, the resource position information indication module 310 is configured to select, by the first terminal, multiple resources, indicating position information of multiple resources, and restricting existence of the resource for indicating the resource availability information between two adjacent resources of the multiple resources selected by the first terminal.

In an example, the first terminal expects that the position of the resource for indicating the resource availability information overlaps the position of the time-domain symbol corresponding to the PSFCH.

In an example, the resource position information indication module 310 is configured to select, by the first terminal, multiple resources and indicates position information of multiple resources. The resource for indicating the resource availability information exists between the first resource and the second resource in the multiple resources. The time interval between the resource for indicating the resource availability information and the first resource is greater than or equal to the first threshold value, and the time interval between the resource for indicating the resource availability information and the second resource is greater than or equal to the second threshold value.

In an example, the resource reselection module 320 is configured to reselect, by the first terminal, the designated resource in a case where the resource availability information from the second terminal indicates that the designated resource is an unavailable resource, reselecting, by the first terminal, where the reselected resource is different from the designated resource.

In an example, the resource position information indication module 310 is configured to indicate, by the first terminal, the position information of multiple resources, receive, by the first terminal, the resource availability information from the second terminal, expect, by the first terminal, that the resource availability information indicates availability of the last one or more resources of the multiple resources.

In an example, the first terminal indicates a position of the resource for indicating the resource availability information.

The above apparatus can execute the resource selection method provided by any one of embodiment one to embodiment four of the present application, and has functional modules and beneficial effects corresponding to the execution method. Technology details that not described in detail in the embodiment can refer to the method provided by the embodiment one to embodiment four of the present application.

Embodiment Eight

Figure 11:
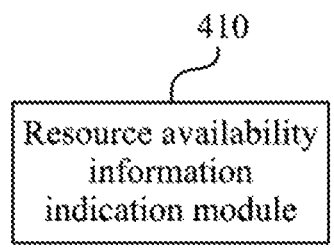
FIG. 11 is a structural diagram of a resource indication apparatus according to embodiment eight of the present application.

As shown in FIG. 11, the resource indication apparatus provided in this embodiment includes a resource availability information indication module 410.

The resource availability information indication module 410 is configured to indicate resource availability information to a first terminal, where the resource availability information is used for indicating availability of a resource set, and the resource set is a subset of multiple resources indicated by the first terminal.

In an example, the control information from the first terminal is received based on the PSCCH, where the control information from the first terminal includes the position information of multiple resources, and the position information of the multiple resources is the time-frequency positions of the resources occupied by the first terminal.

In an example, the resource set includes: a resource set being a subset of multiple resources indicated by the first terminal, and a resource set being the last one or more resources of the multiple resources indicated by the first terminal.

In an example, the resource availability information indication module 410 has a function such that a resource for indicating the resource availability information is located between two resources, where the two resources are two adjacent resources among multiple resources indicated by the first terminal.

In an example, the resource availability information indication module 410 has a function such that a resource for indicating the resource availability information is located between two resources, where the two resources are a first resource and a second resource among multiple resources indicated by the first terminal.

In an example, the resource availability information indication module 410 has a function that the resource for indicating the resource availability information is located between the two resources, where the time interval between the resource for indicating the resource availability information and the first resource is greater than or equal to the first threshold value, and the time interval between the resource for indicating the resource availability information and the second resource is greater than or equal to the second threshold value.

In an example, the resource availability information indication module 410 has a function that the position of the resource for indicating the resource availability information overlaps the position of the time-domain symbol corresponding to the PSFCH.

In an example, the resource availability information indication module 410 is configured to indicate the control information to the first terminal base on the resource for indicating the resource availability information, where the control information includes resource avail ability indication information and acknowledgement information or negative acknowledgement information.

In an example, availability information of the resources is indicated through a channel for a resource availability indication, and the acknowledgement information or the negative acknowledgement information is indicated through the PSFCH. If the sum of the number of channels for the resource availability indication and the number of PSFCHs of which the second terminal needs to transmit simultaneously is greater than the threshold value, the second user device abandons from sending at least one channel for the resource availability indication.

The above apparatus can execute the resource indication method provided by any one of embodiment five to embodiment six of the present application, and has functional modules and beneficial effects corresponding to the execution method. Technology details that not described in detail in the embodiment can refer to the method provided by the embodiment five to embodiment six of the present application.

Embodiment Nine

Figure 12:
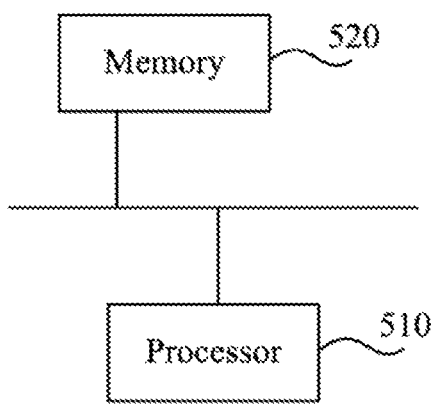
FIG. 12 is a structural diagram of a first terminal according to embodiment nine of the present application.

As shown in FIG. 12, embodiment six of the present application provides a first terminal, and the first terminal includes a memory 520, a processor 510, a program stored on the memory and executable on the processor and a data bus for enabling connection communication between the processor 510 and the memory 520, where the program, when executed by the processor, implements the resource selection method in the embodiments of the present application.

Position information of multiple resources is indicated.

A resource reselection is performed based on resource availability information.

The resource availability information is from a second terminal.

As a computer readable storage medium, the memory 520 may be configured to store software programs, computer executable programs and modules, such as program instructions/modules corresponding to the time-domain resource determination method in the embodiments of the present application. The memory 520 may include a program storage region and a data storage region, where the program storage region may store an operating system and an application program required by at least one function, and the data storage region may store data created depending on the use of the device. Additionally, the memory 520 may include a high-speed random-access memory and may further include a non-volatile memory, for example, at least one magnetic disk memory, a flash memory, or another non-volatile solid-state memory. In some examples, the memory 520 may further include memories that are remotely disposed with respect to the processor 510. Examples of the above network include, but are not limited to, the Internet, an intranet, a local area network, a mobile communication network and a combination thereof.

Embodiment Ten

Figure 13:
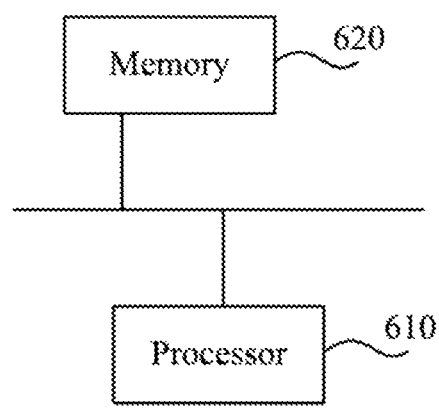
FIG. 13 is a structural diagram of a second terminal according to embodiment ten of the present application.

As shown in FIG. 13, embodiment seven of the present application provides a second terminal, and the second terminal includes a memory 620, a processor 610, a program stored on the memory and executable on the processor and a data bus for enabling connection communication between the processor 610 and the memory 620, where the program, when executed by the processor, implements the resource indication method in the embodiments of the present application.

Resource availability information is indicated to a first terminal.

The resource availability information is used for indicating availability of a resource set.

The resource set is a subset of multiple resources indicated by the first terminal.

As a computer readable storage medium, the memory 620 may be configured to store software programs, computer executable programs and modules, such as program instructions/modules corresponding to the time-domain resource determination method in the embodiments of the present application. The memory 620 may include a program storage region and a data storage region, where the program storage region may store an operating system and an application program required by at least one function, and the data storage region may store data created depending on the use of the device. Additionally, the memory 620 may include a high-speed random-access memory and may further include a non-volatile memory, for example, at least one magnetic disk memory, a flash memory, or another non-volatile solid-state memory. In some examples, the memory 620 may further include memories that are remotely disposed with respect to the processor 610. Examples of the above network include, but are not limited to, the Internet, an intranet, a local area network, a mobile communication network and a combination thereof.

Embodiment Eleven

Embodiment eleven of the present application provides a readable storage medium, storing one or more programs executable by one or more processors to implement the resource selection method in the embodiments of the present application.

Position information of multiple resources is indicated.

A resource reselection is performed based on resource availability information.

The resource availability information is from a second terminal.

Alternatively, resource availability information is indicated to a first terminal.

The resource availability information is used for indicating availability of a resource set.

The resource set is a subset of multiple resources indicated by the first terminal.

It is to be understood by those having ordinary skill in the art that some or all steps of the preceding method and function modules/units in the preceding system or device may be implemented as software, firmware, hardware and suitable combinations thereof.

In the hardware implementation, the division of the preceding function modules/units may not correspond to the division of physical components. For example, one physical component may have multiple functions, or one function or step may be performed jointly by several physical components. Some or all physical components may be implemented as software executed by a processor, such as a central processing unit, a digital signal processor or a microprocessor, may be implemented as hardware, or may be implemented as integrated circuits, such as application-specific integrated circuits. Such software may be distributed on computer-readable media. The computer-readable media may include computer storage media (or non-transitory media) and communication media (or transitory media). As known to those of ordinary skill in the art, the term computer storage media includes volatile and non-volatile as well as removable and non-removable media implemented in any method or technology for storing information (such as computer-readable instructions, data structures, program modules or other data). The computer-storage media include, but are not limited to, a random access memory (RAM), a read-only memory (ROM), an electrically erasable programmable read only memory (EEPROM), a flash memory, or other memory technologies, a compact disc-read only memory (CD-ROM), a digital video disc (DVD) or other optical disc storage, a magnetic cassette, a magnetic tape, disk storage or other magnetic storage apparatuses, or any other media used to store the desired information and accessible by a computer. Moreover, as known to those of ordinary skill in the art, the communication media generally include computer-readable instructions, data structures, program modules or other data in carriers or in modulated data signals transported in other transport mechanisms and may include any information delivery medium.

What is claimed is:

1. A resource selection method, applied to a first terminal, comprising:
    indicating position information of multiple resources to a second terminal; and
    receiving resource availability information for a resource set from the second terminal and performing a resource reselection based on the resource availability information; wherein the resource set is a subset of the multiple resources; and
    wherein a position of a resource of the resource availability information overlaps a position of one or more time-domain symbols corresponding to a physical sidelink feedback channel (PSFCH).

2. The method of claim 1, further comprising:
    sending control information through a physical sidelink control channel (PSCCH);
    wherein the control information comprises the position information of the multiple resources, and the position information of the multiple resources comprises time-frequency positions of occupied resources.

3. The method of claim 1, wherein
    the resource reselection is performed on a target resource based on the resource availability information; and
    releasing the target resource is indicated.

4. The method of claim 1, further comprising:
indicating the position of the resource for indicating the resource availability information to the second terminal.

5. The method of claim 1, further comprising:
selecting the multiple resources and indicating the position information of the multiple resources; and
existence of a resource used for indicating the resource availability information and located between two adjacent resources of the multiple resources selected by the first terminal is restricted.

6. The method of claim 1, further comprising:
selecting the multiple resources and indicating the position information of the multiple resources;
in the selected multiple resources, a resource for indicating the resource availability information exists between a first resource and a second resource; and
a time interval between the resource for indicating the resource availability information and the first resource is greater than or equal to a first threshold value, and a time interval between the resource for indicating the resource availability information and the second resource is greater than or equal to a second threshold value.

7. The method of claim 1, wherein the performing the resource reselection based on the resource availability information comprises:
in a case where the resource availability information from the second terminal indicates that a designated resource is an unavailable resource, reselecting, by the first terminal, a designated resource, wherein the reselected resource is different from the designated resource.

8. The method of claim 1,
wherein the resource availability information indicates availability of last one or more resources in the multiple resources.

9. The method of claim 1, further comprising:
indicating the position of the resource for indicating the resource availability information.

10. A non-transitory storage medium configured as computer-readable storage, storing at least one program, wherein the at least one program is executable by at least one processor to perform the resource selection method according to claim 1.

11. A resource indication method, applied to a second terminal, comprising:
indicating resource availability information to a first terminal;
wherein the resource availability information is used for indicating availability of a resource set; and
wherein the resource set is a subset of multiple resources indicated by the first terminal; and
wherein a position of a resource for indicating the resource availability information overlaps a position of one or more time-domain symbols corresponding to a physical sidelink feedback channel (PSFCH).

12. The method of claim 11, further comprising:
receiving control information through a physical sidelink control channel (PSCCH) from the first terminal;
wherein the control information from the first terminal comprises position information of the multiple resources; and
wherein the position information of the multiple resources comprises time-frequency positions of resources occupied by the first terminal.

13. The method of claim 11, wherein
the resource set is a subset of the multiple resources indicated by the first terminal;
the resource set comprises last one or more resources of the multiple resources indicated by the first terminal.

14. The method of claim 11, wherein the indicating the resource availability information to the first terminal comprises:
a resource for indicating the resource availability information is located between two resources of the multiple resources; and
the two resources are two adjacent resources of the multiple resources indicated by the first terminal.

15. The method of claim 11, wherein the indicating the resource availability information to the first terminal comprises:
a resource for indicating the resource availability information is located between two resources of the multiple resources; and
the two resources are a first resource and a second resource of the multiple resources indicated by the first terminal.

16. The method of claim 11, wherein the indicating the resource availability information to the first terminal comprises:
a resource for indicating the resource availability information is located between two resources of the multiple resources;
wherein a time interval between the resource for indicating the resource availability information and a first resource of the two resources is greater than or equal to a first threshold value, and a time interval between the resource for indicating the resource availability information and a second resource of the two resources is greater than or equal to a second threshold value.

17. The method of claim 11, wherein the indicating the resource availability information to the first terminal comprises:
indicating control information to the first terminal based on a resource for indicating the resource availability information;
wherein the control information comprises resource availability indication information and acknowledgement information or negative acknowledgement information.

18. The method of claim 11, further comprising:
indicating availability information of a resource through a channel for a resource availability indication;
indicating acknowledgement information or negative acknowledgement information through the PSFCH; and
in a case where a sum of a number of channels for the resource availability indication that the second terminal needs to simultaneously transmit and a number of PSFCHs is greater than a threshold value, abandoning, by the second terminal, sending of at least one channel of the channels for the resource availability indication.

19. A non-transitory storage medium configured as computer-readable storage, storing at least one program, wherein the at least one program is executable by at least one processor to perform the resource indication method according to claim 11.

* * * * *